Nov. 26, 1929. A. L. CURRIER 1,736,901
BUTTON BLANK CUTTING MACHINE
Filed Oct. 8, 1926  3 Sheets-Sheet 1
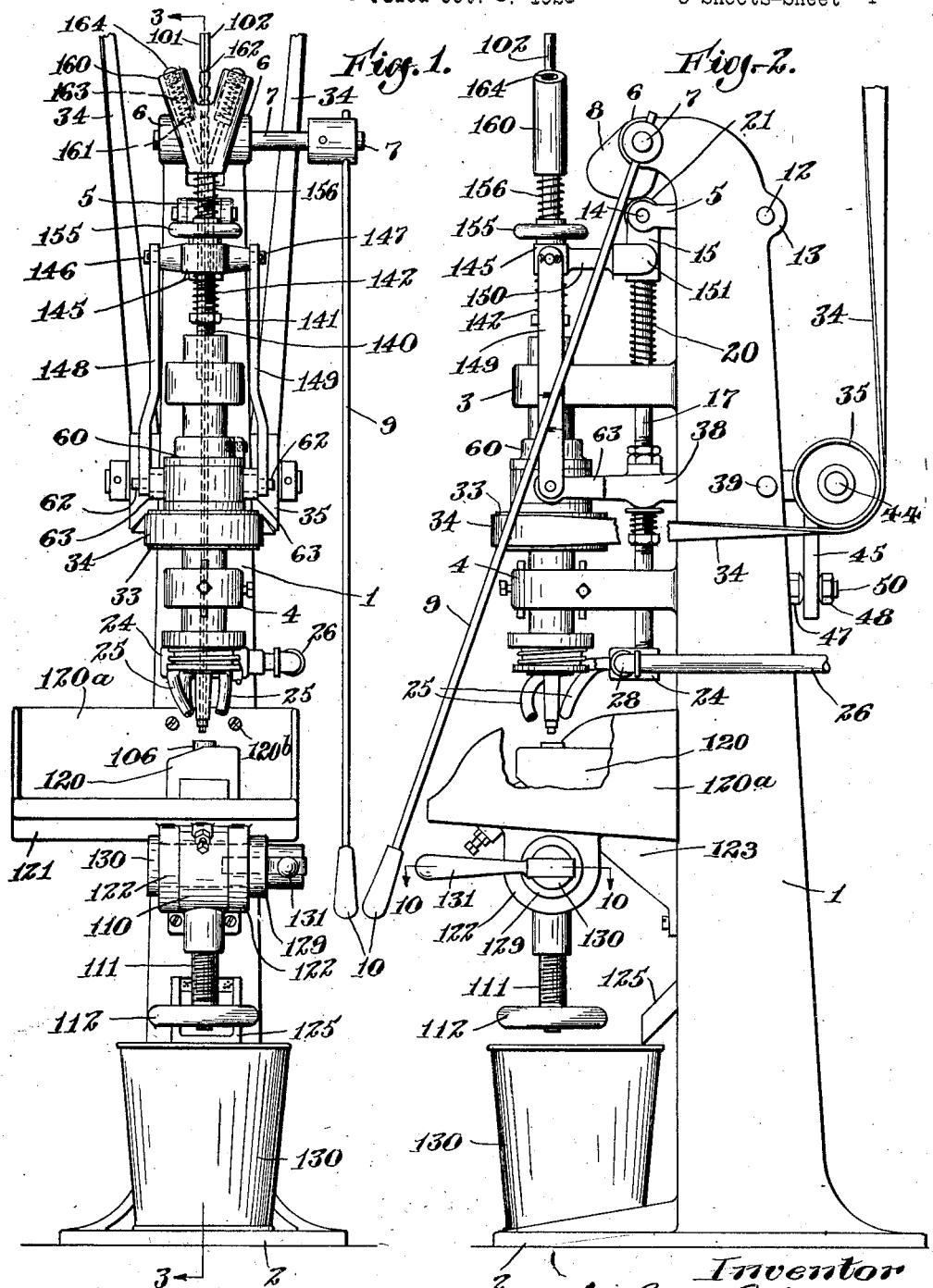

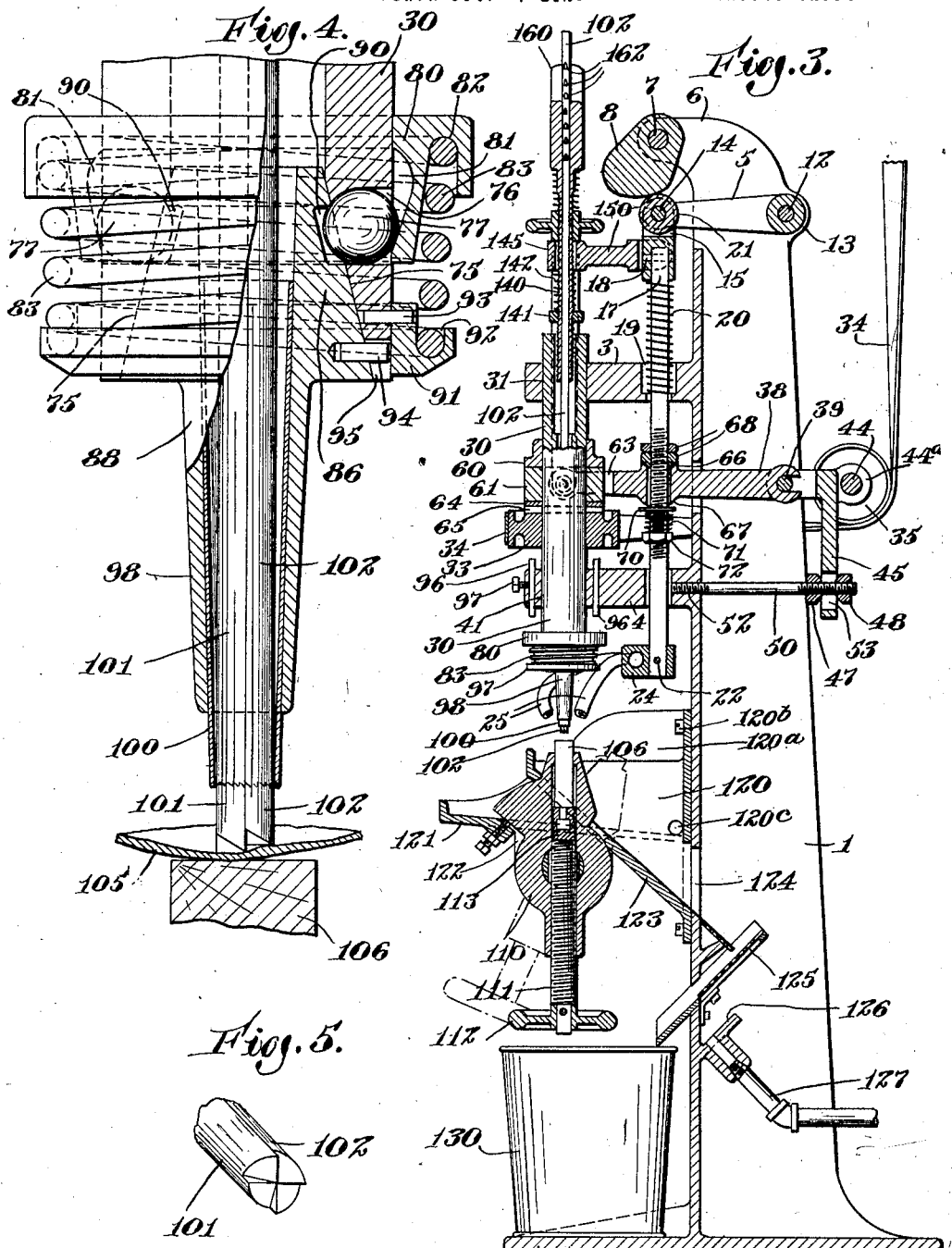

Nov. 26, 1929.  A. L. CURRIER  1,736,901
BUTTON BLANK CUTTING MACHINE
Filed Oct. 8, 1926   3 Sheets-Sheet 3
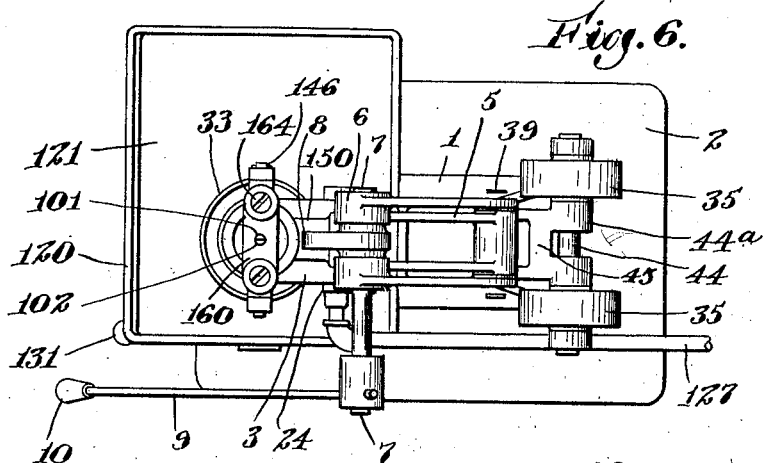
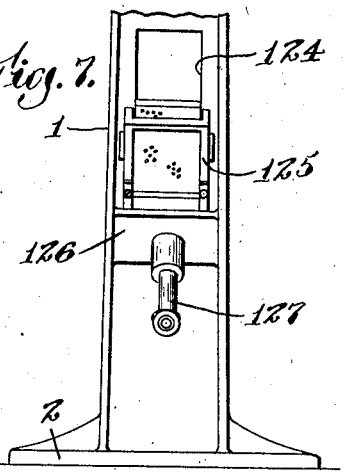
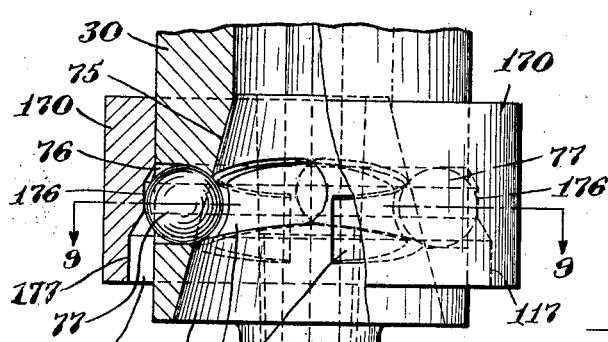
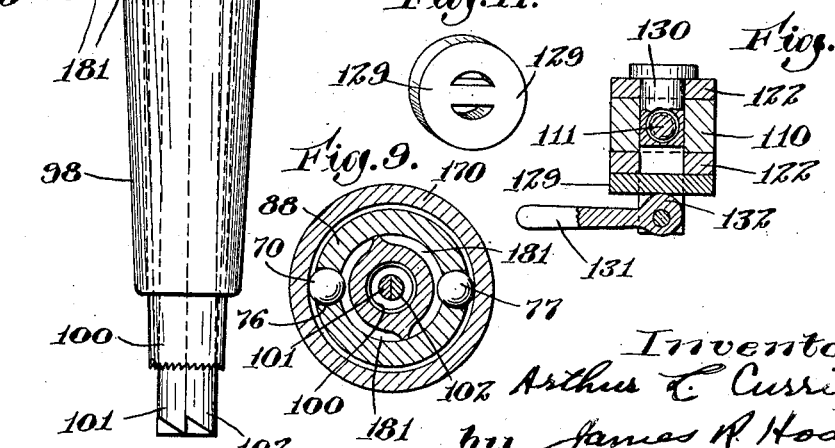
Inventor
Arthur L. Currier
by James R. Hodder
Attorney Patented Nov. 26, 1929

1,736,901

UNITED STATES PATENT OFFICE

ARTHUR L. CURRIER, OF NEW IPSWICH, NEW HAMPSHIRE

BUTTON-BLANK-CUTTING MACHINE

Application filed October 8, 1926. Serial No. 140,371.

My present invention is a novel and improved cutting machine intended primarily for use in cutting out button blanks from shells or equivalent material.

In the manufacture of button blanks from either fresh water or salt water shells, usually known as pearl button blanks, it is necessary to position and hold the shell or material, and cut or saw the blank therefrom. The shell is then shifted, if large enough to form one or more blanks therefrom, and a second blank cut, and so on. These shells are very fragile, being frequently of uneven contour, while the cutting saws utilized must be continually removed and renewed for sharpening.

Important objects of my present invention are to improve and perfect a button blank cutting machine, for this work, and to provide apparatus which will insure firm, quick and easy holding and cutting; which will enable the operator to manipulate the machine with much greater ease and efficiency than has heretofore been possible, and which will insure the steady and uniform production of the machine by less skilled labor than was formerly necessary.

A further and very important feature of my present invention is the provision of means for more readily and easily removing, replacing, and renewing the cutting saw. As above briefly outlined, the cutting saws in this type of machine must be constantly renewed, as a dull saw will break and mar the shell by chipping the edges or the like, and therefore a considerable amount of time has heretofore been consumed by the operators in replacing worn saws. My present machine is directed to facilitate this renewal of saws with a minimum of time and effort.

A further most important feature of the present invention is the provision of novel and efficient shell holding means, which are preferably automatic in operation and which will enable the material from which the blanks are cut to be firmly and quickly held under a uniform tension, even when the blank is of varying surface contour.

It will be appreciated that the shell surface, from which button blanks are cut, particularly a large surface, is of extremely uneven contour, and hence the old instrumentalities as heretofore employed often contacted only at a single point of the blank to be cut. Hence the blank might be distorted in cutting, might be cut unevenly, and might slip or be disalined during the cutting. My present invention obviates the difficulties above briefly noted, and insures a plurality of blank engaging devices capable of automatically fitting the uneven contour of the surface of a blank while still holding the blank at the plurality of points under a substantially uniform tension, which holding and tension devices are automatically controlled.

In carrying out my invention I have devised a machine of extremely simple and efficient construction, of most compact and convenient form, with provision for readily swinging or moving the lower blank holding devices at one side to facilitate removing and renewing the cutting saw, together with an improved cutting saw holding chuck. The saw holding chuck feature of my invention is of very great importance, and two forms of the chuck are shown and described herein, but modifications of the same are more fully illustrated and described in my copending application, Ser. No. 140,770, filed October 11, 1926. I consider the provision of an improved saw holding chuck, which will be substantially automatic in its release as well as in its holding and engaging action, greatly facilitating the ease and speed of renewing the cutting saws, to be of very great importance in the operation of this machine. I preferably form the removable chuck spool or spun, and the recess in the spindle to which said spool is applied of a non-wedging taper construction. With this construction I achieve novel results, in that regardless of how firmly the chuck spool may be seated in the spindle, jamming or wedging of the two parts will be impossible, and upon release of the locking instrumentalities, the spool will automatically disengage from the socket or recess in the spindle, dropping into the operator's hand. I believe that this is an important feature, and I have therefore claimed the same herein broadly.

Further important features, novel combinations, details, and advantages will be hereinafter more fully pointed out and described. Referring to the drawings illustrating a preferred embodiment of my invention, Fig. 1 is a front elevational view of my improved button blank cutting machine;

Fig. 2 is a side view of the machine;

Fig. 3 is a cross sectional view on the line 3—3 of Fig. 1;

Fig. 4 is an enlarged fragmentary cross sectional view illustrating the operation of the plurality of holding devices on a blank of uneven contour;

Fig. 5 is a fragmentary view of the engaging faces of the holding devices;

Fig. 6 is a plan view of the machine;

Fig. 7 is a fragmentary rear view of the machine;

Fig. 8 is a view, partly in cross section, of the chuck holding, driving, and releasing devices showing a modification;

Fig. 9 being a cross sectional view on a reduced scale on the line 9—9 of Fig. 8;

Fig. 10 is a cross sectional view on the line 10—10 of Fig. 2, and

Fig. 11 is a view in perspective of the washer tightening member.

It will be appreciated that my machine may be modified in various ways and forms and may be embodied as a small bench machine before which the operator may stand or sit, or as an entire machine unit, bolted or secured to the floor, the latter form being herein employed for illustrative purposes, and arranged for an operator to be seated in front of same.

As shown in the drawings, my machine comprises a standard 1 secured to a plate 2 which rests on the floor and to which the same may be bolted, if desired. The standard 1 carries a pair of projecting brackets 3 and 4 and arm 5 at the front of the machine to carry the operating devices, and a forked pair of arms 6 at the top of the frame to provide bearings for the shaft 7 carrying therebetween a cam 8, the shaft 7 and cam 8 being actuated by a lever 9 and a handle 10, the latter arranged in convenient position for the operator.

The arm 5 is pivotally secured to a pin 12 fitted through bearings in the boss 13 at the rear of the machine, as clearly shown in Figs. 2 and 3, the projecting end of said arm being secured by a pivot pin 14 to a socketed member 15 carrying a rod 17 fitted in the socket and held therein by a pin 18. The bracket 3 is recessed, as shown at 19, through which the rod 17 may pass, such recess being preferably counterbored, as illustrated in Fig. 3, to receive the lower portion of a coil spring 20 encircling the rod 17 and bearing between the counterbored lower portion of the recess 19 and the member 15, normally exerting an upward tension against said member 15, and adapted to hold the same in constant contact with the lower surface of the cam 8. If desired, I may provide a roll 21, also pivoted on the pin 14, to give an anti-friction bearing 21 between the same and the cam 8.

The rod 17 extends downwardly through an enlarged recess in the bracket 4, and carries at its lowermost end, adjustably secured thereto by a pin 22, a block 24 which, in turn, carries one or more water nozzles or pipes 25—25 in position to drive a constant stream of water on the shell and work during the button sawing operation. The water may be supplied from any suitable source and through a pipe 26, and with an elbow or, if desired, a flexible connection 28 from said pipe to the block 24 and thence to the nozzles 25—25, which will rise and lower slightly during the operation of the machine, and yet at all times direct the water supply onto the work.

I prefer to utilize the rod 17 as a means to actuate the spindle and chuck, and the holding devices for the saw and blank. Thus, a slight action of the cam 8, when moved by the handle 10, and lever 9, will reciprocate the rod 17, either downwardly or permit its upward movement through the action of the spring 20, and this movement is communicated to the spindle, as will be now described.

The spindle carrying the saw holding chuck and workholding devices comprises a tubular shaft 30 slidingly mounted through appropriate recesses 31 in the bracket 3, and 41 in the bracket 4, as clearly shown in Fig. 3. The spindle 30 has keyed thereto in an appropriate position a pulley 33 rotated by a belt 34 led around idler pulleys 35. The pulleys 35 are mounted on a pin 44 in the ears 44ᵃ of the bracket 45, which bracket is fulcrumed at the rear of the frame 1 on the bearing pin 39. The lever 38 is also mounted on the pin 39 adjacent to the rear of the frame 1. The bracket 45 pivots on pin 39, spanning the lever 38 and is held in adjustment by nuts 47 and 48 on a threaded shaft 50 which shaft, in turn, is secured in any suitable way to the frame 1, and as herein shown being threaded into a tapped recess 52 in a portion of the lower bracket 4. This arrangement permits a belt tightening effect by manipulation of the locking nuts 47 and 48, thus rocking the bracket 45 on the pin 44. The shaft 50 with the locking nuts thereon extends through a slotted recess 53 in the bracket 45, thus permitting the bracket 45 to still rock upon its fulcrum 39. Preferably these locking nuts are slightly rounded, as clearly shown in Figs. 2 and 3, therefore permitting a rocking action, while the slot 53 facilitates the same while still permitting the locking nuts to effect the belt tightening.

The spindle 30 carries a flanged hub or bearing 60 spaced from the pulley wheel 33 to receive a loosely fitting collar 61, said collar having a pair of trunnions 62—62 diametrically positioned over which the forked arms 63—63 are fitted, said arms being the forward extensions of the lever 38. Consequently vertical movement or oscillation of the lever 38 on its fulcrum 39 thus effects a raising or lowering of the spindle 30 during its continuous rotation through the actuation of the pulley 33 rigidly secured on said spindle. The collar 61 is firmly and rigidly held in position while permitting a free rotation of the spindle during the operation of the machine.

To effect the raising and lowering of the spindle, I prefer to utilize the arm 38 and the rod 17. As above explained, the rod 17 passes loosely through an enlarged opening in the arm 38, which arm is preferably provided with a concaved boss 66 at the upper part, and convex boss 67 at the lower part. The rod 17 is also threaded, and is provided with a plurality of locking nuts 68 bearing against the upper boss 66 to take up the thrust of the cam 8, the latter causing depression of both the lever 38 and hence movement of the spindle 30 down onto the work. In order to provide a yielding adjustment of this connection between the rod 17 and the lever 38, I supply a washer 70, coil spring 71, and a threaded nut 72, as illustrated in Fig. 3, and adjustment of the locking nuts 68 and 72 serves to adjust the relative position of the lever 38 on the rod 17.

While my machine as thus far described is operated to rotate the spindle 30 to which any suitable saw or cutting device may be secured, I prefer to utilize a novel type of chuck and saw holding apparatus for holding the work. The feature of my invention permitting the work holding devices to engage the shell at a plurality of separately adjustable and independently actuable points while still held under a uniform tension and also permitting an instantaneous removal and replacement of the cutting saw, is of great importance and will now be explained.

The spindle 30 is formed hollow to receive the internally arranged work holding devices, said spindle furthermore being formed at its lower end with an internally bevelled face 75—see Fig. 4. At opposite points are provided openings or recesses 76 arranged to receive holding, driving and locking balls 77. Fitted around the spindle 30 is a recessed ring 80 having an internal annular grooved or recessed portion 81 and an outer groove 82, said outer groove being adapted to receive the top portion of a coil spring 83. The recess 81 is of sufficient extent so that, when relative movement is effected between the ring 80 and the spindle 30, each ball 77 may be forced within the recess 81 and permit the bevelled socket part 86 of the chuck 88 to be released from locking engagement with the ball 77. The chuck 88 is also formed with a cooperating bevelled face to fit the bevel 75, and with an annular groove or recess 90 in which a portion of the locking balls 77 fit or slide when the ring 80 and spindle 30 are in the relative position shown in Fig. 4; viz: when the chuck 88 is locked to the spindle 30. Upon release of the balls 77 from engagement with the groove 90, the chuck 88 may be removed from the spindle, as will be further explained. Secured to the lower portion of the spindle 30 is a ring member 91 having a recess 92 therein to receive the bottom portion of the coil spring 83, and said ring being locked to the spindle 30 by one or more pins 93. Preferably, also, a driving stud or pin 94 is secured to the chuck 88, which pin slides in a slot or recess 95 in the lower portion of the rim of the spindle 30.

Fitted adjustably through the bracket 4 and in alinement with the ring 80, are a plurality of adjustable rods 96 which may be held in adjusted position by appropriate set screws 97. Consequently, on the vertical movement of the spindle 30, the same may be moved until said ring 80 is brought into engagement with the ends of the rods 96, which will thereupon depress said ring 80 against the tension of the spring 83, bringing the recess 81 into alinement with the locking balls 77, into which recesses the balls 77 will normally move, thus moving out of the groove 90 in the chuck 88 and releasing said chuck and permitting the chuck to be instantly removed. When replacing the chuck spool or spun 88, the operator simply grasps said chuck by the depending stem 98, holds it upwardly into the bevelled recess in the spindle 30, the pin or stud 94 engaging the groove 95 and thus guiding the spun or spool, and snaps the chuck past or by the balls 77, which will be engaged in the recess or groove 90, and will thereupon hold, lock, and drive the chuck with the spindle 30.

The chuck 88 is hollow and has a depending shank 98 which receives the tubular saw 100. Preferably these saws are split spring metal which are driven into the slightly bevelled inner walls of the chuck 88 and the shank 98 so that at the saw cutting edge, the same will be a substantially continuous line. This hollow arrangement also permits of my novel work holding devices 101 and 102 which are arranged to project in advance of the cutting edge of the saw 100, and may be of any suitable material such as soft brass, and may also have hardened serrated work engaging faces, as shown in Figs. 4 and 5, which work, shell or material is usually resting on a wood, rubber, or fibre block 106.

In order to support the work rest, or block 106 I provide a swinging bracket 110 having a threaded interior in which the adjusting screw 111 is fitted and manipulated by a wheel or handle 112. Preferably a cushioning member 113 of wood is fitted between the adjusting member 111 and the work block 106, which latter may have an interlocking engagement, as shown in Fig. 3, in order to lower or draw down the block 106, as well as force the same upwardly by appropriate rotation of the handle 112, as desired. This work block 106 is substantially surrounded by a splash plate 120, said splash plate forming a portion of the chute 123. Surrounding the splash plate 120 and upper part of the chute 123, are the walls 120$^a$ of the tray 121, which tray is adapted to hold shells or other material to be operated upon, in ready reach of the operator. The tray 121 and walls 120$^a$ thereof are secured to the frame 1 by screws or the like 120$^b$. The chute 123 extends downwardly and rearwardly as a spout-like portion through the opening 124 of the main frame 1, to collect blanks, and waste shell scraps, and the like, and also prevents the water flowing from the nozzles 25 from unduly splattering the operator. A drain 120$^c$ is provided into the splash pan or chute 120 from the tray 121, so that any water in said tray will flow into the chute and out at the back of the machine. Water from the chute 123 will filter through the screens 125 into a catch groove 126 and thence through a pipe 127 to a suitable place of discharge, while the button blanks will travel down the screen 125 into the receptacle 130 to be removed as desired.

As thus described, the operation of the machine will be readily understood. Upon manipulation of the handle 10, swinging the cam 8 in position to depress the rod 17, said movement also swings the rocking lever 38 on its fulcrum and depresses the rotating spindle 30 until the work engaging portions of the devices 101 and 102 contact with and hold the shell 105 to be cut. Thereupon the continued downward movement of the rotating spindle 30 brings the serrated edge of the saw 100 into cutting engagement with the shell 105, cutting a blank therefrom as the saw travels on downwardly around the holding devices 101 and 102, and through the shell and, if necessary, slightly into the block 106. The operator thereupon releases the handle 10, or brings it backwardly, assisted by the spring 20, and the shell 105 is re-positioned for cutting another blank. This operation is continued until it is desired to renew the saw, whereupon the operator continues the upward movement of the lever 9 until the ring 80 will contact with the pins 96, whereupon the chuck is automatically released, permitting ready removal of the saw 100, and replacement of a new saw, whereupon the operation of the machine is continued as before.

To facilitate the removal and replacement of the chuck 88, I provide any simple means desired to swing the work block 106 out of immediate alignment or position with the chuck 88 and thus permit the more ready removal and replacement of the chuck spun. To this end the entire bracket 110 is mounted to swing in the ears 122 provided on the tray or table 121, being released from vertical position by the cam 132 operated by a lever 131 bearing against a bridged washer 129 and mounted on a shouldered pin 130, as illustrated in Figs. 2, 10 and 11. This permits quick and instant release of the bracket 110 and swinging of the same out of position and its replacement.

In order to provide an independent and yet uniform action on the work engaging members 101 and 102, I extend the same through the hollow chuck and spindle, as above explained, and thence upwardly, as will be now explained.

Fitted loosely in the upper part of the spindle 30 is an externally threaded sleeve 140 carrying with a frictional engagement the work engaging members 101 and 102. The bearing nut 141 is fitted around such sleeve in position to compress a spring 142 between the nut 141 and the crosshead 145. This crosshead has a pair of opposite extensions 146 and 147 to which are pivotally secured a pair of depending links 148 and 149 extending from the crosshead downwardly to pivotal engagement with the trunnions 62 on the collar 61. Hence the depression of the lever 38 through the actuation of the cam 8 on the rod 17 serves to move downwardly the spindle 30 and will also serve to move downwardly a corresponding distance the sleeve 140 carrying the work engaging members 101 and 102 by reason of their frictional engagement therein. In order to prevent the sleeve 140 from rotating, the crosshead 145 has a rearwardly extending arm 150, which arm has a forked extension 151 bearing loosely on the member 15, as clearly shown in Figs. 2 and 3. Mounted also on the sleeve 140 is an adjusting hand wheel 155 threaded thereon and bearing against the top of the crosshead 145 to thus permit a raising or lowering of the sleeve 140 as desired. A coil spring 156 serves to hold the wheel 155 locked in position while permitting a yielding action between the same and the V-shaped member 160. This latter member has its two arms or legs recessed, each carrying an internal plunger 161 adapted to engage one of a series of notches 162 cut respectively in the adjacent side portions of the tops of the members 101 and 102. Each plunger is under yielding tension between a coil spring 163 bearing on top of the plunger 161 and an adjusting screw 164 threaded into the top portion of the open end of each leg of the V. Thus the plungers will normally hold their respective portions 101 and 102 downwardly under a yielding tension and yet will permit the independent vertical movement of each member 101 and 102 as the same contacts with and seats itself on either an even or uneven surface in the shell or work 105. Furthermore, each spring being substantially under similar compression, will hold the work engaging portions with a uniform tension and at a plurality of points.

My improved machine, providing as it does, conveniently arranged, compactly positioned, and economically formed and constructed apparatus, permitting a quick and rapid manipulation, instantaneous renewal and replacement of the saws and chucks, and firmly holding means to engage the work at a plurality of points, automatically taking care of differences in contour of the shells, presents a new machine which is a distinct improvement in this art and which I wish to claim herein broadly.

As above noted, I have several modifications of construction in connection with the chuck holding devices. In Fig. 8 I have illustrated a simple modification of the chuck holding means permitting quick and ready manual manipulation for the locking or releasing instead of the semi-automatc arrangement, as shown in Fig. 4, and heretofore described. As illustrated in Fig. 8, the spindle 30 has the recesses 76 therein to receive the locking ball 77 and the bevelled surface 75 to receive the correspondingly bevelled head of the spool or chuck spun 88 carrying the saw 100 in its shank 98. In this form, however, I provide a simple enclosing and lifting ring 170. This ring is preferably counterbored at 176 and again at 177 to thus afford a large annular recess 180 sufficiently spaced from the outer surface of the spindle 30 to permit the locking ball 77 to roll therein and be released from the grooves 181 in the head of the chuck 88 when the ring 170 is lifted. Thus the operator, when desiring to remove the chuck 88, raises or lifts the ring 170, without stopping rotation of the spindle, if desired, until the locking ball 77 will roll outwardly into the space provided. Thereupon the chuck 88 can be removed or, indeed, will drop into the operator's hand. The head of the chuck 88 has formed therein a pair of spiral grooves, as clearly shown in Fig. 8, adapted to cooperate with and receive the projecting portion of the locking balls 77 when the chuck is replaced in position and the ring 170 dropped downwardly or can be put into position after the ring has dropped down, the portion 176 forcing the balls 77 into holding, locking, and driving engagement with the chucks 88. These grooves 181 may be, and preferably are, formed on the incline from the outer surface of the chuck 88 into a sufficient depth to receive the balls 77, as clearly shown in Fig. 8, whereupon the balls will jump, either between the bottoms of the grooves and the ring 170, or between the edges of the grooves in the chuck and the ring 170, thereupon imparting to the chuck and saw the rotating action of the spindle 30. I believe that my invention of a quickly removable and renewable chuck, particularly for machines of this type, is distinctly new and I claim the same broadly in my said copending application, Ser. No. 140,770, filed October 11, 1926, claiming in this application the advantages, features, and combination of such a chuck with my improved button blank cutting machine.

As illustrated in the form of chuck shown in Fig. 4, the inner bevelled face or taper 75 of the spindle, and the correspondingly tapered face of the spool 86 are formed of a non-wedging taper construction. This results in a chuck structure of great advantages, in that the spool cannot jam in the spindle, the non-wedging taper construction providing for instant disengagement of the spool from the spindle recess upon release of the locking balls 77. Similar non-wedging taper construction is illustrated in Fig. 8, wherein the bevelled face of the chuck spool is formed to co-act with the taper face or bevel 75 of the spindle 30, in such a manner that a non-wedging taper construction is obtained, with the advantages of the form illustrated in Fig. 4.

It will also be appreciated that each of the forms of chuck illustrated and described herein may be utilized in a horizontal operating position, with equal facility and efficiency as in the vertical position herein illustrated. This greatly broadens the field of utility of my novel chucks, enabling them to be embodied in many kinds of machines.

Having thus described my invention, what I claim as new is:

1. In a machine for cutting out button blanks, a work support on which the material to be cut is positioned, a rotating spindle adapted for movement toward and from the work to cut a button blank therefrom, and a plurality of independently movable work holding members movable with and through said spindle, each member being independently and automatically actuated by an adjustable spring.

2. A button blank cutting machine comprising a supporting frame, a rotatable spindle mounted for vertical movement in said frame, a vertically movable member positioned on said frame adjacent to the spindle, manually operated means for moving the member downwardly, automatic means for moving said member vertically, an oscillating arm pivoted on said frame, means connecting the arm to said member, means connecting said arm to said spindle, a pulley keyed to said spindle, a belt for driving said pulley, a bracket spanning said arm and secured to the rear of said frame, guide pulleys mounted on said bracket, said bracket having a depending portion adjustably secured to a portion of said frame and constituting a belt tightening means for said guide pulleys.

3. In a machine for cutting out button blanks, a work support on which the material to be cut is positioned, a hollow rotating spindle movable toward and from the work, a cutting tool in said spindle, a plurality of independently automatically movable work holding members arranged within and extending above said spindle and contacting with the work in advance of the cutting tool during the movement of the cutting tool toward the work, a V-shaped member located above said spindle and through which said work holding members pass, spring controlled plungers in said V member engaging notches in said work holding members to normally hold said members in position and force the work holding members toward said work support.

4. In a machine for cutting out button blanks, a work support on which the material to be cut is positioned, a hollow rotating spindle movable toward and from the work, a cutting tool in said spindle, a plurality of independently automatically movable work holding members arranged within and extending above said spindle and contacting with the work in advance of the cutting tool to force the work against its support during the movement of the cutting tool toward the work, frictional supporting means for said work holding members, a V-shaped member located above said spindle and through which said work holding members pass, spring controlled plungers in said V member engaging notches in said work holding members to normally hold said members in position, and yet permit independent vertical adjustment of said work holding members.

5. In a machine for cutting out button blanks, a work support on which the material to be cut is positioned, a hollow rotating spindle movable toward and from the work, a cutting tool in said spindle, a plurality of independently automatically movable work holding members arranged within and extending above said spindle and contacting with the work in advance of the cutting tool to force the work against its support during the movement of the cutting tool toward the work, a V-shaped member located above said spindle and through which said work holding members pass, spring controlled plungers in said V member engaging notches in said work holding members to normally hold said members in position and yet permit independent vertical adjustment of said work holding members, and a sleeve depending from said V member and loosely fitted in the upper portion of said spindle and surrounding said work holding members.

6. In a machine for cutting out button blanks, a work support on which the material to be cut is positioned, a hollow rotating spindle movable toward and from the work, a cutting tool in said spindle, a plurality of independently automatically movable work holding members arranged within and extending above said spindle and contacting with the work in advance of the cutting tool to force the work against its support during the movement of the cutting tool toward the work, a V-shaped member located above said spindle and through which said work holding members pass, spring controlled plungers in said V member engaging notches in said work holding members to normally hold said members in position and yet permit independent vertical adjustment of said work holding members, a sleeve depending from said V member and loosely fitted in the upper portion of said spindle and surrounding and holding said work holding members and being vertically movable with said spindle.

In testimony whereof, I have signed my name to this specification.

ARTHUR L. CURRIER.